United States Patent
Son et al.

(10) Patent No.: US 10,593,944 B2
(45) Date of Patent: Mar. 17, 2020

(54) CO-PRECIPITATION REACTOR AND METHOD OF MANUFACTURING MATERIAL PRECURSOR FOR SECONDARY BATTERY USING THE SAME

(71) Applicants: Samsung Electronics Co., Ltd., Suwon-si, Gyeonggi-do (KR); SAMSUNG FINE CHEMICALS CO., LTD., Ulsan (KR); Samsung SDI Co., Ltd., Yongin-si, Gyeonggi-do (KR)

(72) Inventors: Youhwan Son, Seongnam-si (KR); Kwangjin Park, Seongnam-si (KR); Jinseok Hong, Seoul (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 797 days.

(21) Appl. No.: 14/816,180

(22) Filed: Aug. 3, 2015

(65) Prior Publication Data
US 2016/0190582 A1 Jun. 30, 2016

(30) Foreign Application Priority Data
Dec. 24, 2014 (KR) .................. 10-2014-0188644

(51) Int. Cl.
*B01J 13/00* (2006.01)
*H01M 4/485* (2010.01)
*H01M 4/505* (2010.01)
*H01M 4/525* (2010.01)
*H01M 4/58* (2010.01)
*B01J 19/18* (2006.01)
*B01J 19/00* (2006.01)
*B01F 15/06* (2006.01)
*B01F 7/00* (2006.01)

(52) U.S. Cl.
CPC ........ *H01M 4/5815* (2013.01); *B01F 7/0065* (2013.01); *B01F 15/065* (2013.01); *B01F 15/068* (2013.01); *B01J 19/0066* (2013.01); *B01J 19/18* (2013.01); *H01M 4/582* (2013.01); *B01F 2015/062* (2013.01); *B01J 2219/0006* (2013.01); *B01J 2219/00063* (2013.01); *B01J 2219/00078* (2013.01); *B01J 2219/00094* (2013.01); *B01J 2219/00135* (2013.01); *B01J 2219/00177* (2013.01); *B01J 2219/00204* (2013.01); *B01J 2219/00229* (2013.01)

(58) Field of Classification Search
CPC .... H01M 4/5815; H01M 4/582; H01M 4/525; H01M 4/505; H01M 4/131; H01M 4/485; H01M 4/0471; H01M 4/0497; H01M 4/139; H01M 4/32; B01F 7/0065; B01F 15/065; B01F 15/068; B01F 2015/062; B01J 19/0066; B01J 19/18; B01J 2219/0006; B01J 2219/00063; B01J 2219/00078; B01J 2219/00094; B01J 2219/00135; B01J 2219/00177; B01J 2219/00204; B01J 2219/00229
USPC ........................................................ 252/500
See application file for complete search history.

(56) References Cited

U.S. PATENT DOCUMENTS 6,336,739 B1 * 1/2002 Lee .................. B01F 1/0011
366/143

FOREIGN PATENT DOCUMENTS

| JP | 1990-00643 A | 1/1999 |
|---|---|---|
| JP | 2003-311137 A | 11/2003 |
| JP | 2012-233599 A | 11/2012 |
| KR | 10-0759751 B1 | 9/2007 |
| KR | 10-0765970 B1 | 10/2007 |
| KR | 10-0815583 B1 | 3/2008 |
| KR | 10-0887186 B1 | 2/2009 |
| KR | 20100059601 A * | 6/2010 |
| KR | 1020100059601 A | 6/2010 |
| KR | 1020110039657 A | 4/2011 |
| KR | 1020130100737 A | 9/2013 |
| KR | 10-1396416 B1 | 5/2014 |
| KR | 10-1405108 B1 | 6/2014 |

OTHER PUBLICATIONS

Lee et al., "Synthetic optimization of Li[Ni1/3Co1/3Mn1/3]O2 via co-precipitation", Electrochimica Acta, vol. 50, 2004, pp. 939-948.

* cited by examiner

*Primary Examiner* — Haidung D Nguyen
(74) *Attorney, Agent, or Firm* — Cantor Colburn LLP

(57) ABSTRACT

A co-precipitation reactor for manufacturing a positive electrode active material precursor for a secondary battery, the co-precipitation reactor including a reaction chamber having a plurality of suppliers configured to direct a reaction material and a pH adjusting material into the reaction chamber, a stirrer configured to be disposed in the reaction chamber, a drive motor configured to rotate the stirrer, a stirring shaft configured to receive power from the drive motor and rotate the stirrer, a first heater configured to heat an outside of the reaction chamber to heat the reaction material and the pH adjusting material, and a second heater configured to heat an inside of the reaction chamber to heat the reaction material and the pH adjusting material.

9 Claims, 8 Drawing Sheets
(1 of 8 Drawing Sheet(s) Filed in Color)

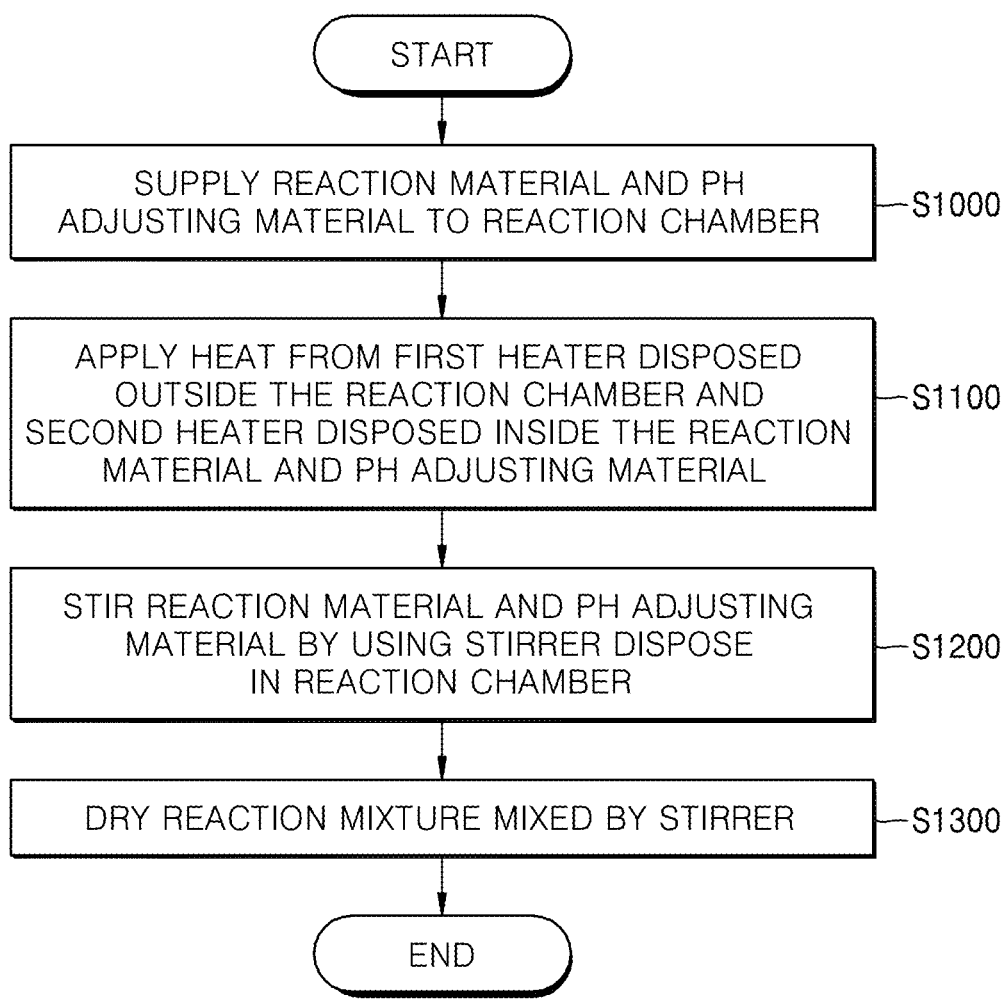

CO-PRECIPITATION REACTOR AND METHOD OF MANUFACTURING MATERIAL PRECURSOR FOR SECONDARY BATTERY USING THE SAME

CROSS REFERENCE TO RELATED APPLICATION

This application claims priority to and the benefit of Korean Patent Application No. 10-2014-0188644, filed on Dec. 24, 2014, in the Korean Intellectual Property Office, and all the benefits accruing therefrom under 35 U.S.C. § 119, the content of which is incorporated herein in its entirety by reference.

BACKGROUND

1. Field

The present disclosure relates to a co-precipitation reactor and methods of manufacturing a positive electrode active material precursor for a secondary battery using the same.

2. Description of the Related Art

Currently, a variety of portable electronic information communication devices such as camcorders, mobile phones, laptops, and personal digital assistants (PDAs) are available due to the rapid growth of the electronic, communication, and computer industries. As secondary batteries have been used to supply power to such devices, research on secondary batteries that can be miniaturized and have small thickness, weight, high capacity, and high performance has been performed.

From among the secondary batteries, lithium secondary batteries have been widely used as the main driving power supply for portable electronic information communication device due to their small weight and high energy density. A lithium-ion secondary battery includes a positive electrode, a negative electrode, an electrolyte providing a moving path of lithium ions between the positive electrode and the negative electrode, and a separator. The positive electrode may include a lithium oxide and the negative electrode may include carbon compounds. The lithium-ion secondary battery may generate electrical energy by an oxidation-reduction reaction generated during insertion and extraction of lithium ions in/from the positive electrode and the negative electrode while the lithium ions pass through the electrolyte towards the negative electrode. In order to manufacture the positive electrode active material used in the lithium-ion secondary battery, a multicomponent metal oxide including nickel, cobalt, and manganese, or nickel, cobalt, and aluminum is desirable as a precursor of the positive electrode active material. Although various methods of manufacturing a multicomponent metal oxide positive electrode active material precursor have been proposed, an improved method is desired.

SUMMARY

Provided is a co-precipitation reactor capable of easily controlling the size of a positive electrode active material precursor that is used in a lithium-ion secondary battery and methods of manufacturing a positive electrode active material precursor using the same.

Additional aspects will be set forth in part in the description which follows and, in part, will be apparent from the description.

According to an aspect, the co-precipitation reactor for manufacturing the positive electrode active material precursor for the secondary battery includes: a reaction chamber having a plurality of suppliers configured to direct a reaction material and a pH adjusting material into the reaction chamber; a stirrer configured to be disposed in the reaction chamber; a drive motor configured to rotate the stirrer; a stirring shaft configured to receive power from the drive motor in order to rotate the stirrer; a first heater configured to heat an outside of the reaction chamber to heat the reaction material and the pH adjusting material; and a second heater configured to heat an inside of the reaction chamber to heat the reaction material and the pH adjusting material.

The second heater may be disposed inside the stirring shaft and apply heat from an exterior wall surface of the stirring shaft to the reaction material and the pH adjusting material. The second heater may be configured to heat an exterior surface of the stirring shaft.

The second heater and the stirring shaft may extend along a longitudinal direction of the reaction chamber and disposed in a center portion of the reaction chamber.

The second heater may be a heat pipe.

The second heater may be a heat wire having a selected resistance.

According to the aspect, the co-precipitation reactor may further include a controller controlling the second heater to operate or not according to a degree of a temperature gradient of the reaction material and the pH adjusting material in a region adjacent to a center and an exterior wall portion of the reaction chamber.

The stirring shaft may be connected to an output portion of the drive motor at an angle of 90 degrees, wherein the power may be transmitted to the stirring shaft.

The stirrer may include a raising screw fixed to the stirring shaft so as to make the reaction material and the pH adjusting material move upward, and a lowering impeller fixed to the stirring shaft and disposed in a lower portion of the raising screw so as to make the reaction material and the pH adjusting material move downward.

The reaction material may be a metal salt solution including nickel (Ni), cobalt (Co), and manganese (Mn) as a metal salt, and the positive electrode active material precursor for the secondary battery may be represented by Formula 1.

$$Li_aNi_{1-x-y-z}Co_xMn_yM_zO_{2-\delta}X_\delta \quad \text{Formula 1}$$

wherein $0.95 \leq a \leq 1.2$, $0.01 \leq x \leq 0.5$, $0.01 \leq y \leq 0.5$, $0.005 \leq z \leq 0.3$, $0.05 \leq x+y+z \leq 0.6$, $0 \leq \delta \leq 0.1$, M denotes at least one element selected from magnesium (Mg), aluminum (Al), chromium (Cr), vanadium (V), titanium (Ti), iron (Fe), zirconium (Zr), zinc (Zn), silicon (Si), yttrium (Y), niobium (Nb), gallium (Ga), tin (Sn), molybdenum (Mo), and tungsten (W), wherein X denotes a halogen element and sulfur (S).

A pH of the positive electrode active material precursor for the secondary battery formed by adding a sodium hydroxide (NaOH) solution or an ammonia aqueous solution to the reaction material may be 11 to 12, wherein the NaOH solution may be the pH adjusting material.

According to an aspect, a method of manufacturing a positive electrode active material precursor for a secondary battery includes: supplying a reaction material and a pH adjusting material to a reaction chamber; applying heat from a first heater disposed outside the reaction chamber, and a second heater disposed inside the reaction chamber to heat the reaction material and the pH adjusting material; stirring the reaction material and the pH adjusting material using a stirrer disposed inside the reaction chamber to form a stirred reaction material; and drying the stirred reaction material to manufacture the positive electrode active material.

In the applying of heat to the reaction chamber, determining whether to operate the second heater may be based on a degree of a temperature gradient of the reaction material and the pH adjusting material in a region adjacent to a center and an exterior wall portion of the reaction chamber.

The reaction material may be a metal salt solution including nickel (Ni) and manganese (Mn) as a metal salt, and the mixed reaction material may be represented by Formula 1.

   Formula 1 wherein 0.95≤a≤1.2, 0.01≤x≤0.5, 0.01≤y≤0.5, 0.005≤z≤0.3, 0.05≤x+y+z≤0.6, 0≤δ≤0.1, M denotes at least one element selected from magnesium (Mg), aluminum (Al), chromium (Cr), vanadium (V), titanium (Ti), iron (Fe), zirconium (Zr), zinc (Zn), silicon (Si), yttrium (Y), niobium (Nb), gallium (Ga), tin (Sn), molybdenum (Mo), and tungsten (W), wherein X denotes a halogen element and sulfur (S).

A pH of the mixed reaction material formed by adding a sodium hydroxide (NaOH) solution or an ammonia aqueous solution may be 11 to 12, wherein the NaOH solution may be the pH adjusting material.

The stirrer may include a raising screw fixed to the stirring shaft so as to make the reaction material and the pH adjusting material move upward, and a lowering impeller fixed to the stirring shaft and disposed in a lower portion of the raising screw so as to make the reaction material move downward.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the exemplary embodiments, taken in conjunction with the accompanying drawings in which:

FIG. 6 is a flow chart of an embodiment of a method of manufacturing a positive electrode active material precursor for a secondary battery using a co-precipitation reactor;

DETAILED DESCRIPTION

Figure 1:
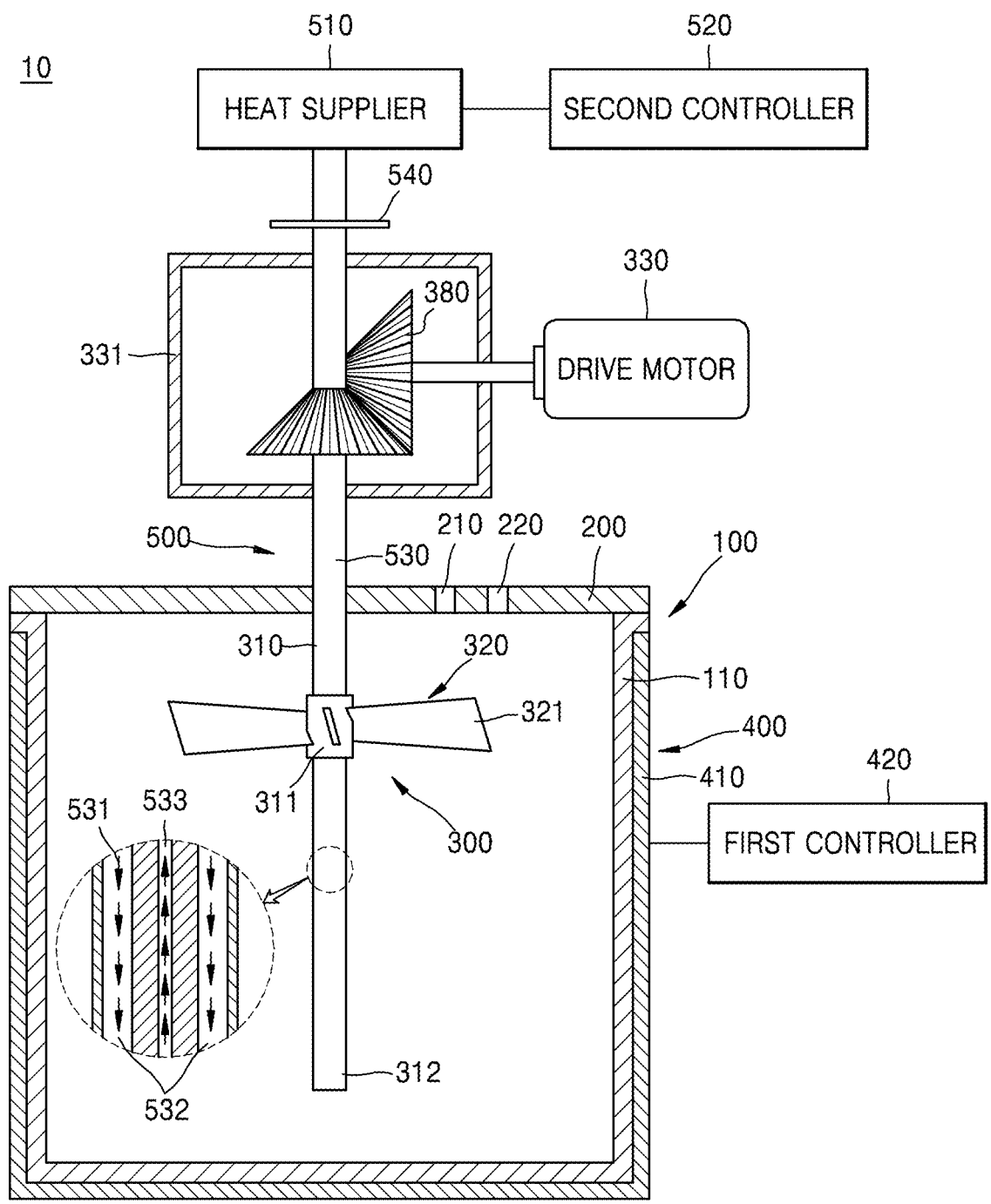
FIGS. 1 to 3 are sectional views of an embodiment of a co-precipitation reactor.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, expressions such as "at least one of", when preceding a list of elements, modify the entire list of elements and do not modify the individual elements of the list.

Hereinafter, example embodiments will be described in further detail with reference to the accompanying drawings. In the drawings, like reference numerals denote like elements, and the sizes of components may be exaggerated for clarity. The embodiments described below are merely exemplary, and various modifications may be made therein.

It will be understood that when a layer is referred to as being "on" another layer or substrate, it may be directly on the other layer or substrate, or one or more intervening layers may also be present.

Although terms such as "first" and "second" may be used herein to describe various elements or components, these elements or components should not be limited by these terms. These terms are only used to distinguish one element or component from another element or component.

As used herein, the singular forms "a", "an", and "the" are intended to include the plural forms as well, unless the context clearly indicates otherwise. It will also be understood that the terms "comprises", "includes", and "has", when used herein, specify the presence of stated elements, but do not preclude the presence or addition of other elements, unless otherwise defined.

"Halogen" means one of the elements of Group 17 of the periodic table (e.g., fluorine, chlorine, bromine, iodine, and astatine).

A co-precipitation method, in which a multicomponent metal salt including nickel, cobalt, manganese, aluminum, and zirconium is used as a starting material, is considered as an economical and realistic method for production of a multicomponent positive electrode active material precursor.

Figure 2:
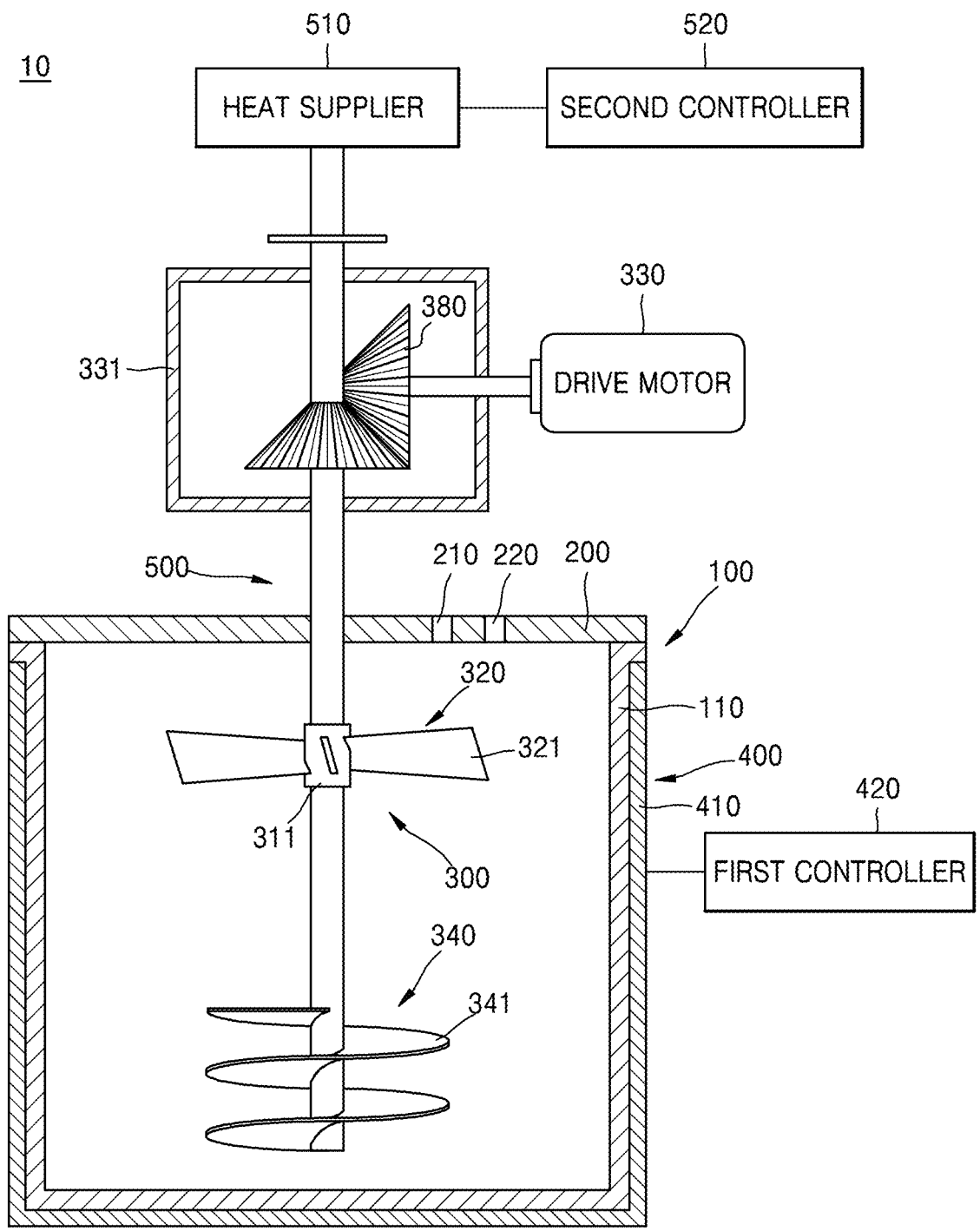
Figure 3:
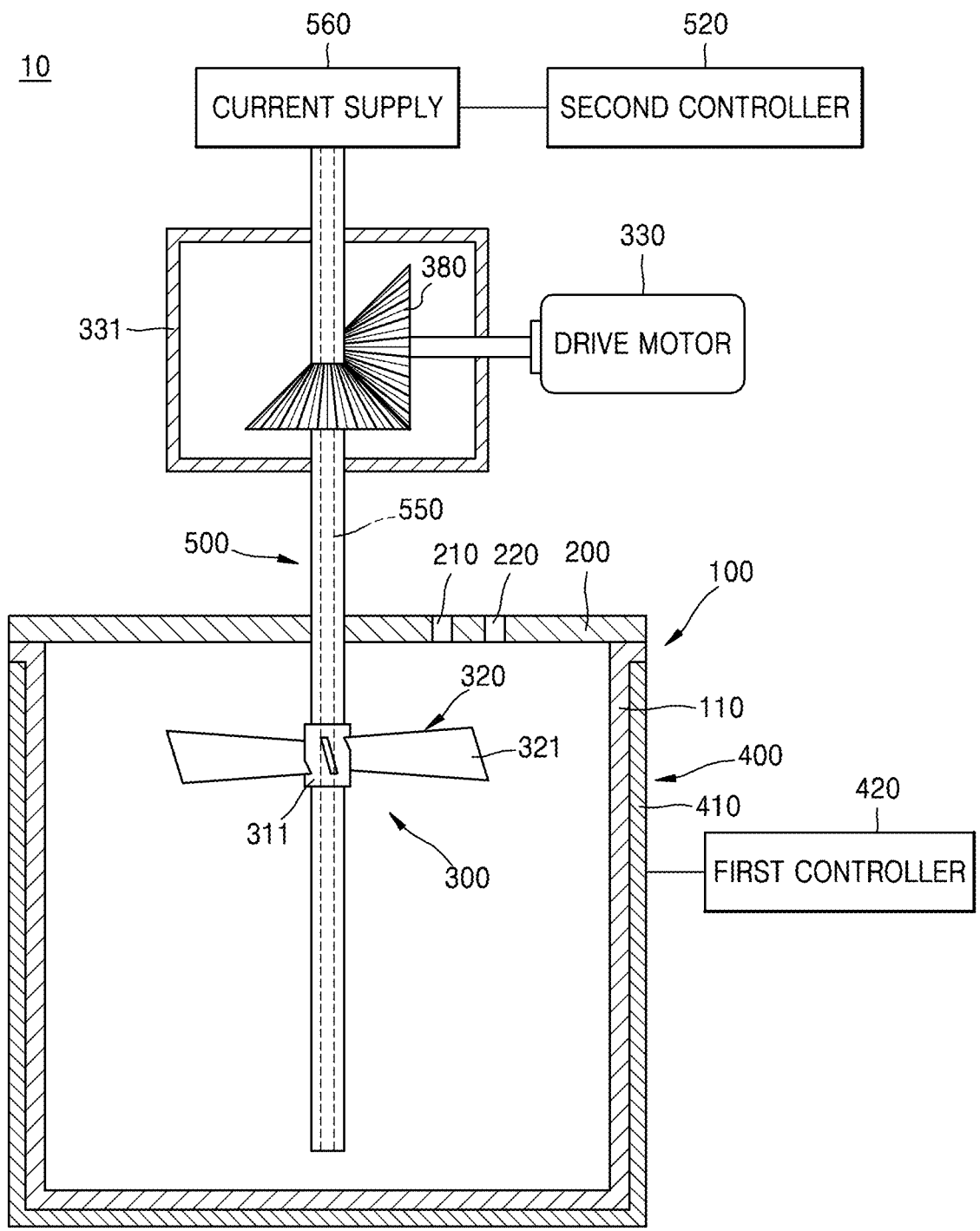

FIG. 1 is a sectional view of an embodiment of a co-precipitation reactor. FIG. 2 is a sectional view of another embodiment of a co-precipitation reactor. FIG. 3 is a sectional view of yet another embodiment of a co-precipitation reactor.

Referring to FIG. 1, a co-precipitation reactor 10 is a continuous stirring type tank reactor in which a stirring device is installed, and reaction starting materials, e.g., a mixed metal oxide, an alkali solution, ammonia, and water, for example, are continuously supplied thereto. The co-precipitation reactor 10 may include a reaction chamber 100 capable of storing a reaction material and a pH adjusting material, a lid 200 capable of sealing the reaction chamber 100, and a stirring device 300 capable of stirring the reaction material and the pH adjusting material.

The reaction chamber 100 may have a cylindrical shape with one open end thereof so as to supply the starting materials. The lid 200 may comprise a plate member capable of blocking the opened end of the reaction chamber 100. An integrated reaction chamber may comprise the reaction chamber 100 and the lid 200, wherein the reaction chamber 100 and the lid 200 are integrally formed.

The lid 200 may include a first reaction starting material supplier 210 in order to supply a mixed metal salt including a mixed metal oxide solution that is a reaction starting material, i.e., nickel, cobalt, manganese, aluminum, zirconium and so on to the reaction chamber 100, and a second reaction starting material supply pipe 220 for charging an alkali solution such as a solution comprising distilled water and at least one selected from an ammonia aqueous solution and a sodium hydroxide aqueous solution to the reaction chamber 100. Pumps (not shown) with which the starting material is quantitatively pumped and forcibly fed to the reaction chamber 100 may be respectively disposed in the first and second reaction starting material supply pipes. The reaction starting materials continuously supplied by each of the pumps may be stirred inside the reaction chamber 100 and may simultaneously generate a co-precipitation reaction.

The stirring device 300 may include a stirring shaft 310, a lowering impeller 320, and a drive motor (a drive means such as a stir motor) 330 for rotation driving the stirring shaft 310 at selected speed. The stirring shaft 310 may be disposed in a gear chamber 331 in which a lubricant (not shown) is included so as to be connected to the drive motor 330 disposed outside the reaction chamber 100. The lowering impeller 320 may be fixed to the stirring shaft 310. The lowering impeller 320 may include a boss 311 fitted into the stirring shaft 310 and a wing 321 fixed to the boss 311.

A plurality of wings 321 may be disposed in the boss 311 and may be formed of a plate member radially extended from the boss 311. The plurality of wings 321 may be tilted at a predetermined angle with respect to a section perpendicular to the boss 311 so as to transfer downward the reaction material and the pH adjusting material. In other words, the wings 321 of the lowering impeller 320 may transfer downward the reaction material when a surface toward a rotation direction is tilted to direct downward and rotate with the stirring shaft 310.

Referring to FIG. 2, the co-precipitation reactor 10 may further include a raising screw 340 that is disposed below the stirring shaft 310 and capable of transferring the reaction material and the pH adjusting material to the upper part of the stirring shaft 310. The raising screw 340 may be disposed fixed to the stirring shaft 310 and opposed to the lowering impeller 320. The raising screw 340 may include a plurality of wings 341 that are connected downward while winding the stirring shaft 310. Accordingly, the raising screw 340 lifts the reaction material upward and the lowering impeller 320 transfers the reaction material downward so that the reaction material and the pH adjusting material are collected in a center portion of the reaction chamber 100 while rotating the reaction material and the pH adjusting material located upward and downward. The reaction material and the pH adjusting material are supplied through the first and second reaction starting material supply pipes 210, 220. In this process, the reaction materials may be uniformly stirred while the reaction material and the pH adjusting material located on a side move to the position of the reaction material that is transferred by the lowering impeller 320 and the raising screw 340, but the inventive concept is not limited thereto. A baffle (not shown) which may change a flow of the reaction material into a turbulence by disturbing flows of the reaction material and the pH adjusting material, and thus capable of easily stirring the reaction materials may be further disposed on an inner wall of the reaction chamber 100.

The co-precipitation reactor 10 may include a first heater 400 in order to maintain a constant reaction temperature. The first heater 400 may be a heating device that is disposed on an external wall of the reaction chamber 100 and properly heats the reaction chamber 100 under a desired reaction temperature condition by being turned on and off. For example, as illustrated in FIGS. 1 and 2, the first heater 400 may be a water jacket 410 that is disposed on the external wall of the reaction chamber 100 and includes a hot water supply device supplying a heat medium (e.g., hot water) that exchanges heat with the reaction chamber 100. The first heater 400 may include a temperature sensor that senses a temperature of a reaction space in the reaction chamber 100, and a first controller 420 that controls turning on and off of the first heater according to a detection value of the temperature sensor other than the water jacket 410 heating the external wall of the reaction chamber 100.

First, distilled water may be disposed, e.g., injected, in the reaction chamber 100 in order to manufacture a positive electrode active material precursor for a secondary battery using the co-precipitation reactor 10 according to an exemplary embodiment. Next, nitrogen gas may be supplied to the reaction chamber 100 to bubble the distilled water, and thus dissolved oxygen which may exist in the reaction chamber 100 may be removed. A mixed metal oxide aqueous solution may be continuously supplied to the reaction chamber 100 at a constant speed. In order to maintain an inside temperature of the reaction chamber 100 in a predetermined range, the reaction chamber 100 may be heated using the first heater 400, and in order to adjust a pH in the reaction chamber 100, an ammonia solution or a sodium hydroxide solution may be supplied to the reaction chamber 100. Afterwards, a particle nucleus of the positive electrode active material precursor for the secondary battery may be formed by rotating the stirring shaft 310.

Particle growth after the generation of the particle nucleus may be determined by Equation 1.

$$dr/dt = D(C-Cs)Vm/R^* \qquad \text{Equation 1}$$

In Equation 1, C denotes an entire equilibrium concentration of an reaction mixture including the distilled water stored in the reaction chamber 100, the mixed metal oxide aqueous solution, and the pH adjusting material, Cs denotes a particle concentration of a generated positive electrode active material precursor, Vm denotes a mole volume of the particle of the generated positive electrode active material precursor, and R* denotes a particle diameter of the generated positive electrode active material precursor. Also, D denotes a dispersion coefficient of the generated product and is represented by Equation 2.

$$D = D_0 \cdot 10^{(-Ed/RT)} \qquad \text{Equation 2}$$

In Equation 2, $D_0$ denotes an initial concentration of the reaction mixture including the distilled water stored in the reaction chamber 100, the mixed metal oxide aqueous solution, and the pH adjusting material, R denotes a gas constant, T denotes a reaction temperature, and $E_d$ denotes activation energy.

Equation 3 shown below is obtained by separating the variables in Equation 1 and integrating the resulting equation.

$$r^2 = 2D(C-Cs)Vmt + (R^*)^2 \qquad \text{Equation 3}$$

In Equation 3, r denotes a particle diameter of the positive electrode active material precursor for a secondary battery that is a final product.

Referring to Equation 3, it can be seen that the particle diameter r of the positive electrode active material precursor for the secondary battery, that is, particle growth of the product is proportional to a dispersion coefficient D and a reaction time t. Here, referring to Equation 2, it can be seen that the dispersion coefficient D is defined as function with the reaction temperature T. Therefore, referring to Equations 2 and 3, when a composition device capable of control the reaction temperature T in the reaction chamber 100 and the reaction time t is applied to the co-precipitation reactor 10, the composition device may control the particle diameter r of the positive electrode active material precursor for the secondary battery that is a final product.

As described above, the first heater 400 is disposed outside the reaction chamber 100 and may apply heat to a reaction material in the reaction chamber 100, e.g., a mixture aqueous solution of the mixed metal salts and the pH adjusting material. For example, when the first heater 400 is the water jacket 410, heat may be transmitted to an exterior wall portion 110 of the reaction chamber 100 from the hot water supplied by the hot water supply device. The heat transmitted to the exterior wall portion 110 of the reaction chamber 100 may be also transmitted to the reaction material and the pH adjusting material stored in the reaction chamber 100. In this case, the reaction material and the pH adjusting material, which are in an aqueous state, begin to be heated from a region adjacent to the exterior wall portion 110 of the reaction chamber 100. After that, the heat may be transmitted from the reaction material and the pH adjusting material in a region adjacent to the exterior wall portion 110 of the reaction chamber 100 to the reaction material in the center portion of the reaction chamber 100 by conduction and convection processes.

In the continuous co-precipitation reactor 10 in which the reaction material, such as a mixed metal salts solution, and the pH adjusting material, such as an ammonia aqueous solution and a sodium hydroxide aqueous solution, as the first heater 400 is disposed outside the reaction chamber 100, are continuously supplied to the reaction chamber 100, a predetermined temperature gradient may be generated between the region adjacent to the exterior wall portion 110 of the reaction chamber 100 and the center portion of the reaction chamber 100 until a predetermined time elapses. As described above, since the particle diameter r of the positive electrode active material precursor for the secondary battery, which is a final product, may be determined by the reaction temperature T rather than the reaction time t, when the temperature gradient is generated in the reaction chamber 100, the particle diameter r of the positive electrode active material precursor for the secondary battery may be different according to the position of the reaction chamber 100 in which the final product is formed. Since a temperature of the region adjacent to exterior wall portion 110 of the reaction chamber 100 is different from that of the center portion of the reaction chamber 100, a particle diameter r of a positive electrode active material precursor for a secondary battery that is formed in the region adjacent to the exterior wall portion 110 of the reaction chamber 100 and a particle diameter r of a positive electrode active material precursor for a secondary battery that is formed in the center portion of the reaction chamber 100 may be different from each other. Therefore, when a temperature gradient which may be generated in the reaction chamber 100 is reduced, uniform particles of the positive electrode active material precursor for the secondary battery may be formed in the entire region of the reaction chamber 100.

In order to reduce the temperature gradient which may be generated in the reaction chamber 100, a second heater 500 capable of directly applying heat to the reaction material and the pH adjusting material may be disposed in the reaction chamber 100. For example, when the second heater 500 is a heat pipe 530, the heat pipe 530 is disposed in the stirring shaft 310 and may extend along a longitudinal direction of the reaction chamber 100, and the stirring shaft 310 in which the heat pipe 530 is included may be disposed in a center portion of the reaction chamber 100 so that the reaction chamber 100 may be symmetrical.

Heat transmitting materials 531 such as water or alcohol included in the heat pipe 530 may be disposed in the stirring shaft 310 that is decompressed. A heat exchanging part 540 capable of direct heat exchanging with a heat supplier 510 is disposed on one end 311 of the stirring shaft 310 and may apply heat to the liquid-state heat transmitting materials 531. The vaporized heat transmitting materials 531 may be moved to the other end 312 of the stirring shaft 310 through a first channel 532. The heat transmitting materials may be re-liquefied by applying heat to the reaction material and the pH adjusting material in the reaction chamber 100, in the process of moving from the one end 311 to the other end 312. The heat transmitting materials that reached the other end 312 may return to the one end 311 through a second channel 533 formed in the heat pipe 530 via a capillary phenomenon or by using pumps, and the heat vaporizing process in which heat is applied again from a heat supplier 510 in the one end 311 of the stirring shaft 310 may be repeated.

The second controller 520 may control heat applied from the heat pipe 530 to the heat supplier 510. For example, when a temperature gradient of the reaction material and the pH adjusting material between the region adjacent to exterior wall portion 110 of the reaction chamber 100 and the center portion of the reaction chamber 100 is increased, the second controller 520 may reduce a temperature gradient in the reaction chamber 100 by raising a temperature of the center portion of the reaction chamber 100 by raising a temperature of the heat supplier 510 so that a greater amount of heat may be applied from the heat supplier 510 to the heat pipe 530.

Referring to FIG. 3, when the second heater 500 is a heat wire 550 according to other embodiment of the inventive concept, the heat wire 550 is disposed in the stirring shaft 310 and may extend along the longitudinal direction of the reaction chamber 100. The stirring shaft 310 including the heat wire 550 may be disposed in the center portion of the reaction chamber 100 so that the reaction chamber 100 may be symmetrical.

The heat wire 550 formed of conductor including resistance may be disposed in the stirring shaft 310. A current supply 560 disposed on one end of the heat wire 550 may apply current to the heat wire 550. Thus, heat may be applied from the extended heat wire 550 to the reaction material and the pH adjusting material that are located in the reaction chamber 100 along the longitudinal direction of the reaction chamber 100 in the stirring shaft 310. The second controller 520 may control a temperature of the reaction material and the pH adjusting material that are stored in the reaction chamber 100 and heated by the heat wire by controlling the current supply 560. For example, when the temperature of the region adjacent to exterior wall portion 110 of the reaction chamber 100 is lower than that of the center portion of the reaction chamber 100, the second controller 520 may reduce a temperature gradient in the reaction chamber 100 to raise a temperature of the center portion of the reaction chamber 100 by raising a temperature applied from the heat wire 550 to the reaction material as increasing current applied from the current supply 560 to the heat wire 550.

When the heat pipe 530 or the heat wire 550 is disposed in the stirring shaft 310 and the heat supplier 510 or the current supply 560 for applying heat to the heat pipe 530 or the heat wire 550 is disposed on an upper end of the stirring shaft 310, the drive motor 330 for transmitting power in order to rotate the stirring shaft 310 may be disposed at a predetermined angle with the stirring shaft 310. For example, referring to FIGS. 1 to 3, the stirring shaft 310 and the drive motor 330 may be disposed to be orthogonal to each other by using a bevel gear 380. Therefore, the stirring shaft 310 may receive power from the drive motor 330 and may transfer heat or current from the heat supplier 510 or the current supply 560 that are disposed on the upper end of the stirring shaft 310 to the heat pipe 530 or the heat wire 550.

The second heater 500 is disposed in the stirring shaft 310 in the above embodiments, but the inventive concept is not limited thereto. The second heater 500 may be disposed on any part of the reaction chamber 100 so as to be apart from the stirring shaft 310 in order to reduce the temperature gradient of the reaction material in the reaction chamber 100. Also, at least one second heater 500 may be disposed in the reaction chamber 100. Moreover, the second heater 500 is not limited to the heat pipe 530 or the heat wire 550, and any heating device capable of applying heat to a reaction material in the reaction chamber 100 may be used.

Figure 4:
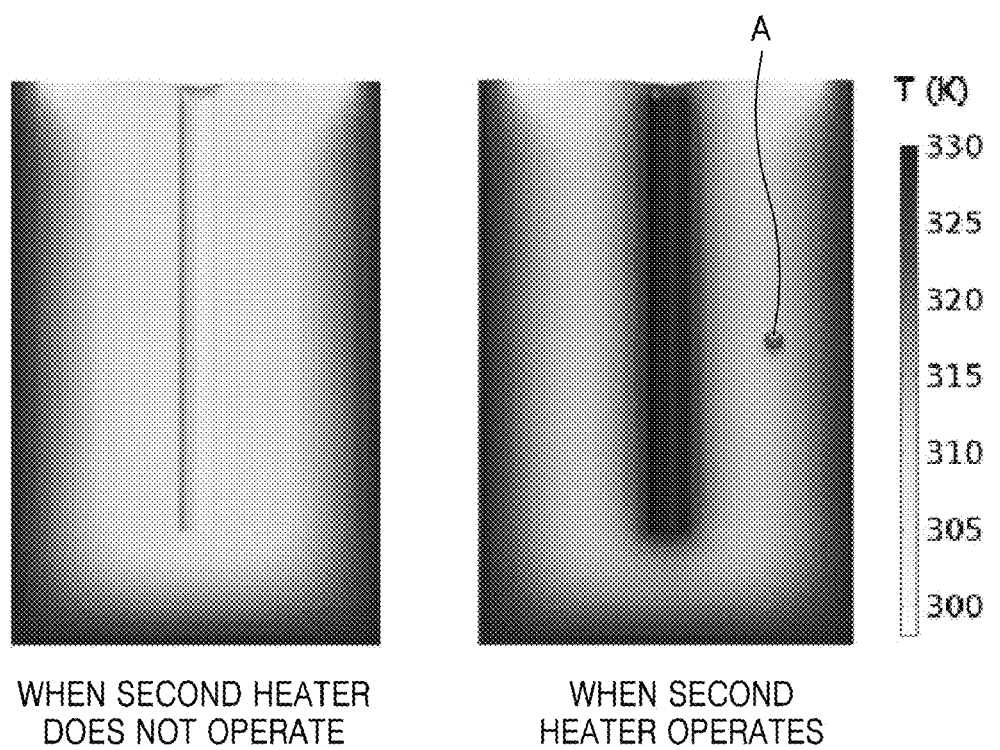
FIG. 4 is a sectional view of a co-precipitation reactor showing temperature before and after applying a second heater.
Figure 5:
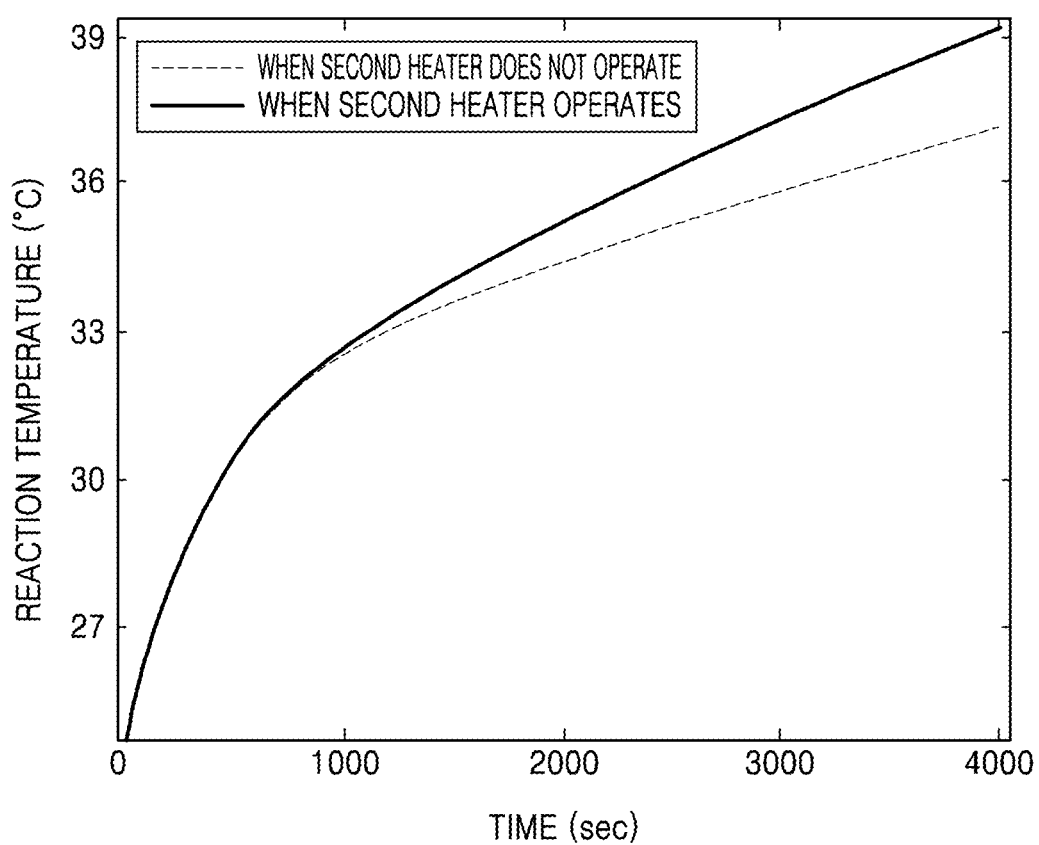
FIG. 5 is a graph of reaction temperature (degrees Celsius, ° C.) versus time (seconds) illustrating temperature change of the reaction chamber in FIG. 4.

FIG. 4 is a sectional view of the co-precipitation reactor showing temperature change before and after applying the second heater 500. FIG. 5 is a graph illustrating temperature change of the reaction chamber 100 before and after applying the second heater 500.

As described above, when the second heater 500 is disposed in the reaction chamber 100, a temperature gradient in the reaction chamber 100 may be reduced. For example, referring to FIGS. 4 and 5, the reaction chamber 100 may include the first heater 400 and the second heater 500 emitting a heating temperature of 333 K. Here, when a reaction temperature is measured after a predetermined time (e.g., 4000 seconds) elapsed at a position A between the exterior wall portion 110 of the reaction chamber 100 and the center portion of the reaction chamber 100, a reaction temperature when the second heater 500 in the center does not operate is 309 K while a reaction temperature when the second heater 500 in the center operates is 313 K. In other words, when the second heater 500 is not disposed in the center portion of the reaction chamber 100, the reaction temperature from the exterior wall portion 110 of the reaction chamber 100 to the center is gradually reduced. Therefore, the reaction temperature of the center portion of the reaction chamber 100 is the lowest temperature and the reaction temperature of the region adjacent to the exterior wall portion 110 of the reaction chamber 100 is the highest temperature. However, when the second heater 500 having the same heating temperature as the first heater 400 is disposed in the center portion of the reaction chamber 100, reaction temperatures of the exterior wall portion 110 of the reaction chamber 100 and the center portion of the reaction chamber 100 are almost the same, and thus a relatively small temperature gradient may be generated between the exterior wall portion 110 of the reaction chamber 100 and the center portion of the reaction chamber 100. Accordingly, when the second heater 500 is disposed in the reaction chamber 100, a temperature gradient of a reaction temperature in the entire region of the reaction chamber 100 over time may be small compared to the case when the second heater 500 is not disposed in the reaction chamber 100. Therefore, when the second heater 500 is disposed in the reaction chamber 100, particles of the positive electrode active material precursor for the secondary battery may be uniformly formed in the entire region of the reaction chamber 100.

Figure 7A:
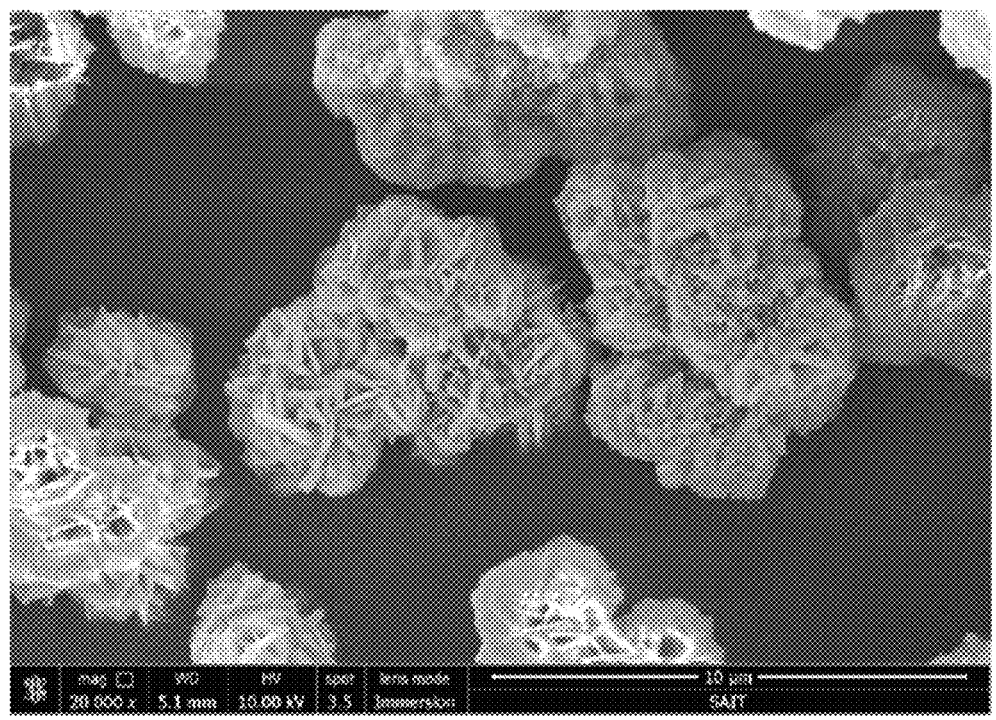
FIG. 7A is a scanning type electron micrograph (SEM) photograph showing a positive electrode active material precursor according to Example 1.
Figure 7B:
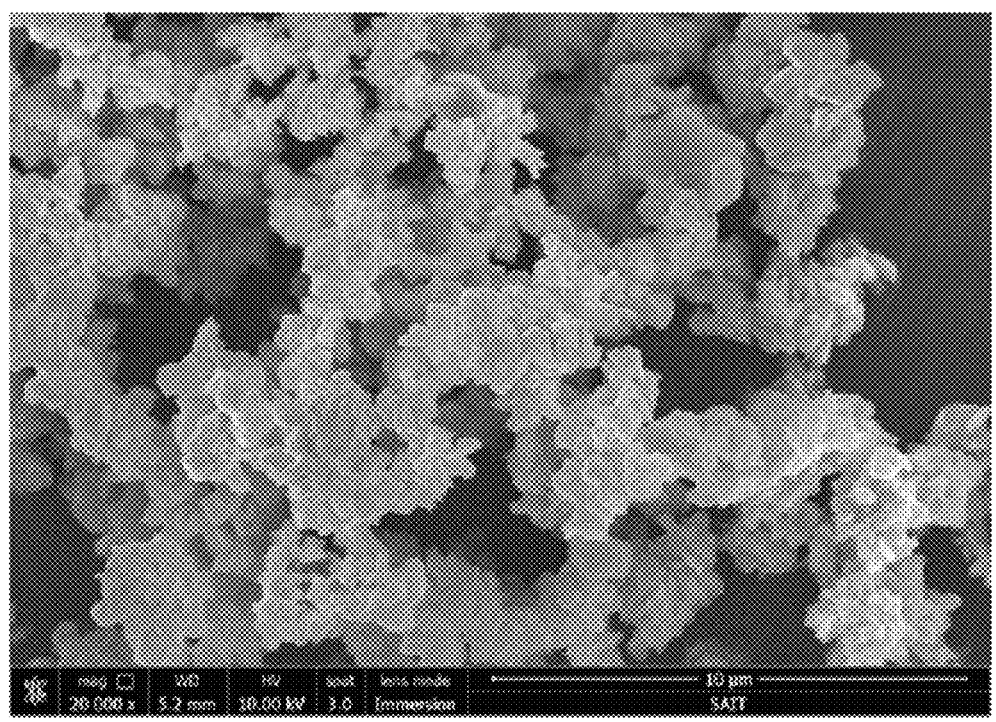
FIG. 7B is a SEM photograph showing a positive electrode active material precursor according to Comparative Example 1.
Figure 8:
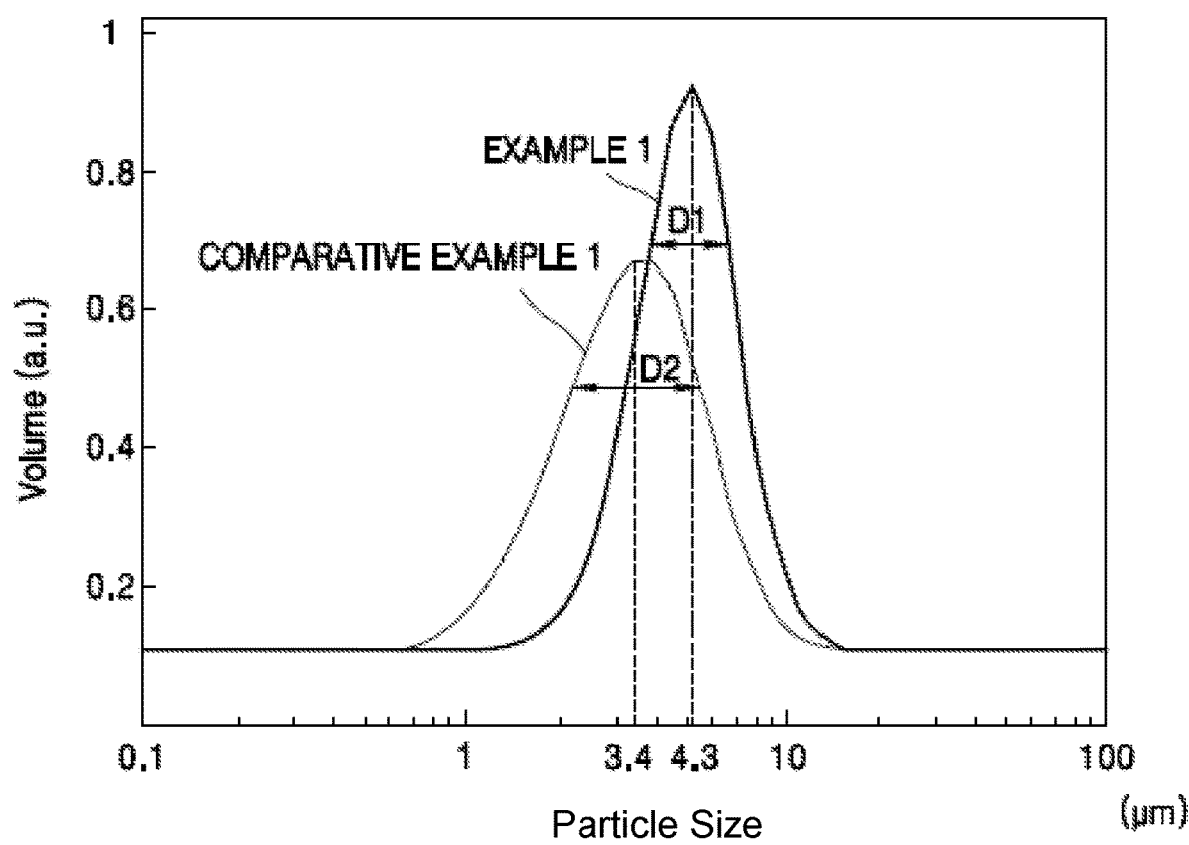
FIG. 8 is a graph of volume (arbitrary units, a.u.) versus particle size (micrometers, μm) illustrating a particle size distribution of the positive electrode active material precursor for the secondary battery according to Example 1 and Comparative Example 1.

FIG. 6 is a flow chart of a method of manufacturing a positive electrode active material precursor for a secondary battery by using a co-precipitation reactor according to an embodiment. FIG. 7A is a scanning type electron micrograph (SEM) photograph showing a positive electrode active material precursor for a secondary battery according to Example 1, and FIG. 7B is a SEM photograph showing a positive electrode active material precursor for a secondary battery according to Comparative Example 1. FIG. 8 is a graph illustrating a particle size distribution of the positive electrode active material precursor for the secondary battery according to Example 1 and Comparative Example 1.

A method of manufacturing a positive electrode active material by using the co-precipitation reactor will be described below based on Example and Comparative Example. The Examples are desirable embodiments, but the inventive concept is not limited thereto.

Example 1

As described above, the co-precipitation reactor 10 according to Example 1 of the inventive concept may include the columnar reaction chamber 100, wherein upper and lower surfaces of the chamber 100 have a diameter of 1 m and a height of 1.5 m, and the drive motor 330 having an output equal to or greater than 80 W. The stirring shaft 310 connected to the drive motor 330 is disposed in the reaction chamber 100, and the lowering impeller 320 and the raising screw 340 are fixed to the stirring shaft 310.

Referring to FIG. 6, a reaction material and a pH adjusting material are injected into the reaction chamber 100 in order to manufacture a positive electrode active material precursor for a secondary battery (S1000). For example, 4 liters of distilled water are poured in the reaction chamber 100 and nitrogen gas is supplied to the co-precipitation reactor 10 at a speed of 2 L/min by bubbling, and thus dissolved oxygen is removed from the distilled water. Moreover, a precursor aqueous solution having a concentration of 2.4 M in which nickel sulfate, manganese sulfate, and cobalt sulfate are mixed in molar ratio of 0.2:0.15:0.65 may be continuously supplied to the reaction chamber 100 at a speed of 0.3 L/hour. Furthermore, a sodium hydroxide solution having a concentration of 4.0 M may be supplied to the reaction chamber 100 in order to control a pH of the reaction material to be between 11 and 12.

Heat may be applied to the reaction material and the pH adjusting material from the first heater 400 disposed outside the reaction chamber 100 and the second heater 500 disposed inside the reaction chamber (S1100). For example, the first heater 400 and the second heater 500 emit heating temperature of 333 K, are disposed inside and outside the reaction chamber 100, and may apply heat to the reaction material and the pH adjusting material. The second controller 520 may reduce a temperature gradient in the reaction chamber 100 by controlling the heat applied from the heat supplier 510 to the heat pipe 530. For example, referring to FIG. 1, when a temperature gradient is increased between the region adjacent to the exterior wall portion 110 of the reaction chamber 100 and the center portion of the reaction chamber 100, the second controller 520 may reduce the temperature gradient in the reaction chamber 100 by raising the temperature of the center portion of the reaction chamber 100 by raising the temperature of the heat supplier 510 so that a greater amount of heat may be applied from the heat supplier 510 to the heat pipe 530.

The reaction material and the pH adjusting material may be stirred by using a stirrer 300 disposed in the reaction chamber 100 (S1200). For example, the reaction material and the pH adjusting material may be stirred by rotating the stirring shaft 310 of the stirrer 300 disposed in the reaction chamber 100 at 1000 rpm. The reaction material needs to remain in the reaction chamber 100 for an average of 8 hours. For a much higher density, it is possible to increase a total reaction time to 24 hours or more by maintaining a normal state of the reaction material after the reaction reaches a normal state.

The reaction mixture mixed by the stirrer may be dried (S1300). For example, a reaction mixture stirred by the stirrer 300 is filtered, washed using water, and dried in a hot air drier of 110° C. for 12 hours, and thus a positive electrode active material precursor according to Formula 1 may be obtained. However, a reaction mixture according to an embodiment of an inventive concept is not limited thereto, and a positive electrode active material precursor for a secondary battery including any chemical compound capable of obtaining by a co-precipitation reaction also may be obtained by co-precipitation reactor and methods of manufacturing a positive electrode active material precursor for a secondary battery using the same.

   Formula 1 wherein $0.95 \le a \le 1.2$, $0.01 \le x \le 0.5$, $0.01 \le y \le 0.5$, $0.005 \le z \le 0.3$, $0.05 \le x+y+z \le 0.6$, $0 \le \delta \le 0.1$, M denotes at least one element selected from the group consisting of magnesium (Mg), aluminum (Al), chromium (Cr), vanadium (V), titanium (Ti), iron (Fe), zirconium (Zr), zinc (Zn), silicon (Si), yttrium (Y), niobium (Nb), gallium (Ga), tin (Sn), molybdenum (Mo), and tungsten (W), and X denotes a halogen element and sulfur (S). FIG. 7A illustrates a SEM photograph of a positive electrode active material precursor for a secondary battery manufactured according to the above process.

Comparative Example 1

A mixed metal oxide was co-precipitated using the co-precipitation reactor 10 without including the second heater 500 in Comparative Example 1. In other words, a composite hydroxide may be manufactured by using only the co-precipitation reactor 10 without including the second heater 500 under the same reaction condition as that of Example 1. Co-precipitated products finally obtained were washed, filtered, and dried and a SEM photograph of a positive electrode active material precursor for a secondary battery manufactured according to the above process is shown in FIG. 7B.

Referring to FIG. 8, since the quantity of particles having a diameter of 4.3 μm from among particles of a positive electrode active material precursor for a secondary battery generated by Example 1 is greater than the quantity of particles having a diameter of 3.4 μm from among particles of a positive electrode active material precursor for a secondary battery generated by Comparative Example 1, and since a distribution width D1 according to a particle size of the positive electrode active material precursor for the secondary battery generated by Example 1 is narrower than a distribution width D2 according to a particle size of the positive electrode active material precursor for the secondary battery generated by Comparative Example 1, it can be seen that the particles of the positive electrode active material precursor for the secondary battery generated by Example 1 are more uniformly formed compared to the particles of the positive electrode active material precursor for the secondary battery generated by Comparative Example 1.

As described above, according to the one or more of the above exemplary embodiments, co-precipitation reactors and methods of manufacturing a positive electrode active material precursor for a secondary battery using the same may uniformly form a particle size of the positive electrode active material precursor for the secondary battery that is finally obtained by minimizing a temperature gradient of a reaction liquid stored in the co-precipitation reactor.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A co-precipitation reactor for manufacturing a positive electrode active material precursor for a secondary battery, the co-precipitation reactor comprising:
    a reaction chamber having a plurality of suppliers configured to direct a reaction material and a pH adjusting material into the reaction chamber;
    a stirrer configured to be disposed in the reaction chamber;
    a drive motor configured to rotate the stirrer;
    a stirring shaft configured to receive power from the drive motor and rotate the stirrer;
    a first heater configured to heat an outside of the reaction chamber;
    a first controller configured to control the first heater;
    a second heater configured to heat an inside of the reaction chamber; and
    a second controller configured to control the second heater,
    wherein the second controller is configured to control the second heater to operate according to a temperature gradient of the reaction material and the pH adjusting material in a region adjacent to a center and adjacent to an exterior wall of the reaction chamber.

2. The co-precipitation reactor of claim 1, wherein the second heater is disposed inside the stirring shaft and is further configured to heat an exterior surface of the stirring shaft to heat the reaction material and the pH adjusting material when present.

3. The co-precipitation reactor of claim 2, wherein the second heater and the stirring shaft extend in a longitudinal direction of the reaction chamber and are disposed in a center portion of the reaction chamber.

4. The co-precipitation reactor of claim 2, wherein the second heater is a heat pipe.

5. The co-precipitation reactor of claim 2, wherein the second heater is a heat wire.

6. The co-precipitation reactor of claim 1, wherein the stirring shaft is connected to an output portion of the drive motor at an angle of 90 degrees, and wherein the output portion is configured to transmit power to the stirring shaft.

7. The co-precipitation reactor of claim 1, wherein the stirrer comprises a raising screw fixed to the stirring shaft and configured to make the reaction material and the pH adjusting material move upward, and a lowering impeller fixed to the stirring shaft and disposed in a lower portion of the raising screw and configured to make the reaction material and the pH adjusting material move downward.

8. The co-precipitation reactor of claim 1, wherein the reaction material comprises a metal salt solution comprising nickel, cobalt, and manganese, and wherein the positive electrode active material precursor for the secondary battery is represented by Formula 1:

$$Li_aNi_{1-x-y-z}Co_xMn_yM_zO_{2-\delta}X_\delta \qquad \text{Formula 1}$$

wherein $0.95 \leq a \leq 1.2$, $0.01 \leq x \leq 0.5$, $0.01 \leq y \leq 0.5$, $0.005 \leq z \leq 0.3$, $0.05 \leq x+y+z \leq 0.6$, $0 \leq \delta \leq 0.1$, M denotes at least one element selected from magnesium, aluminum, chromium, vanadium, titanium, iron, zirconium, zinc, silicon, yttrium, niobium, gallium, tin, molybdenum, and tungsten, and X denotes a halogen element and sulfur.

9. The co-precipitation reactor of claim 1, wherein a pH of the positive electrode active material precursor for a secondary battery formed by adding a sodium hydroxide solution or an ammonia aqueous solution to the reaction material is 11 to 12, and
wherein the pH adjusting material is a sodium hydroxide solution.

* * * * *